(12) United States Patent
Hallett

(10) Patent No.: US 6,199,462 B1
(45) Date of Patent: Mar. 13, 2001

(54) METHOD OF REPAIRING CYLINDRICAL WORKPIECES AND LATHE THEREFOR

(76) Inventor: Thomas A. M. Hallett, Ste. #3, 9804-112 Street, Edmonton, Alberta (CA), T5K 1L4

( * ) Notice: Subject to any disclaimer, the term of this patent is extended or adjusted under 35 U.S.C. 154(b) by 0 days.

(21) Appl. No.: 09/123,943

(22) Filed: Jul. 28, 1998

(51) Int. Cl.[7] ............................................... B23B 5/16
(52) U.S. Cl. ........................... 82/162; 82/165; 82/113; 82/167; 82/164
(58) Field of Search ........................ 82/1.11, 142, 165, 82/166, 167, 162, 110, 113, 47, 164; 408/215, 221, 222; 279/17, 18, 66, 67

(56) References Cited

U.S. PATENT DOCUMENTS

| | | | | |
|---|---|---|---|---|
| 286,333 | * | 10/1883 | Sanders | 82/142 |
| 630,998 | * | 8/1899 | Smith | 82/164 X |
| 771,997 | * | 10/1904 | Palm | 82/164 X |
| 2,816,301 | * | 12/1957 | Hopkins | 82/165 X |
| 4,819,527 | * | 4/1989 | Redman | 82/165 |
| 5,615,590 | * | 4/1997 | Speckhahn | 82/162 |
| 5,680,801 | * | 10/1997 | Keller | 82/163 X |

* cited by examiner

Primary Examiner—Henry Tsai
(74) Attorney, Agent, or Firm—Christensen O'Connor Johnson Kindness PLLC

(57) ABSTRACT

A method of repairing a drill pipe having first and second connector ends, each of the first and second connectors ends including a threaded portion and sealing portions, with a lathe having a chuck with longitudinally spaced first and second sets of jaws, the method comprising the steps of mounting the drill pipe in a lathe, gripping the first connector end of the drill pipe with each of the first and second sets of jaws, orienting the first connector end by manipulation of the first and second sets of jaws into a working position; and rotating the drilling pipe against a working tool to machine the threaded portion and sealing portion of the first connector end and produce a new threaded portion and sealing portion of the first connector end. A lathe with longitudinally spaced first and second sets of jaws is also disclosed. A device for positioning of subsequent workpieces without repeating alignment steps is also disclosed.

3 Claims, 9 Drawing Sheets

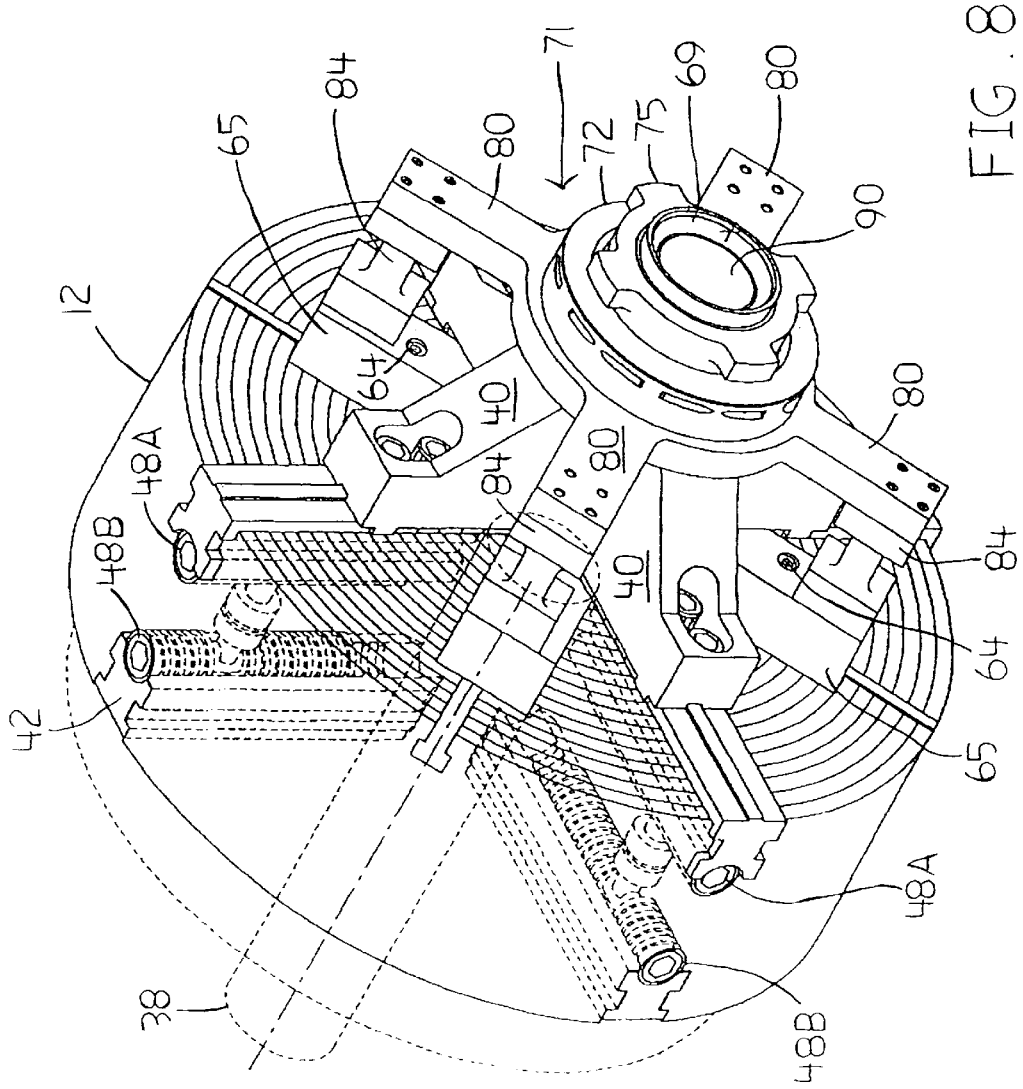

METHOD OF REPAIRING CYLINDRICAL WORKPIECES AND LATHE THEREFOR

FIELD OF THE INVENTION

This invention relates to a method of repairing drill pipes, and to a new lathe, particularly for use in repairing drill pipes.

BACKGROUND OF THE INVENTION

Drill pipes are threaded together in use in drill strings during drilling, for example of oil or gas wells. One end of a drill pipe has an internally threaded box or female connection, while the other end has an externally threaded pin or male connection so that the drill pipes may be threaded together. The drill pipe adjacent the box or pin is enlarged to form an upset and provide strength for the joint, but to reduce the cost of making the drill pipe, the upset typically does not extend very far down the pipe length, typically not much more than about twice the pipe diameter. The internal bores and threads of the box and pin are machined precisely to allow the box and pin to seal together on sealing surfaces at either end of the threads, and also perhaps at intermediate points between threaded portions.

During drilling, stresses on the drill pipe and especially on the boxes and pins cause the interior surface of the box and the exterior surface of the pin to become worn, such that they do not seal together, and fluid within the drill pipe can leak. Since drill pipe is expensive, rather than throw out the drill pipe when it is worn, drilling contractors will repair or have the drill pipe repaired by refinishing the boxes and pins. The refinishing is carried out by machining a new set of threads and sealing surfaces deeper into the box and pin respectively. This eliminates a part of the enlarged portion of the box and pin. After several repairs, the enlarged portion of the box or pin is gradually eliminated until no further repairs can be carried out and the drill pipe is discarded.

The machining of the drill pipe is typically carried out using a lathe having a chuck with jaws mounted in a plane at one end of the lathe. The chucks hold and rotate one end of a drill pipe against a working tool. The other end of the drill pipe is held in a steady rest. Often, the drill pipe will be bent at the end, with the consequence that when cradled in the lathe, the portion of the end being worked on does not rotate precisely in a circle. In this instance, a large amount of metal on the end of the drill pipe may need to be taken off in order to obtain a precisely configured box or pin. This limits the number of times the drill pipe can be repaired, and consequently increases the operating costs of the drilling contractor.

SUMMARY OF THE INVENTION

According to one aspect of the present invention, there is provided a method of allowing multiple repairs of bent drill pipes without losing too much of the box or pin material. According to a further aspect of the invention, a novel chuck and lathe is provided for carrying out the method of the invention.

There is thus provided in accordance with one aspect of the invention, a method of repairing a drill pipe having first and second connector ends, each of the first and second connectors ends including a threaded portion and sealing portions, with a lathe having a chuck with longitudinally spaced first and second sets of jaws, the method comprising the steps of mounting the drill pipe in a lathe, gripping the first connector end of the drill pipe with each of the first and second sets of jaws, orienting the first connector end by manipulation of the first and second sets of jaws into a working position; and rotating the drilling pipe against a working tool to machine the threaded portion and sealing portion of the first connector end and produce a new threaded portion and sealing portion of the first connector end.

There is also provided in accordance with a further aspect of the invention, a lathe for machining a drill pipe, the lathe comprising a chuck, first and second sets of jaws adjustably mounted on the chuck, the first set of jaws being mounted radially in the chuck at a first longitudinal position and the second set of jaws being mounted radially in the chuck in a second longitudinal position spaced from the first first longitudinal position, each of the first and second sets of jaws including x and y positioning jaws, a motor for rotating the chuck; and means to machine a drill pipe gripped by the jaws.

In a further aspect of the invention, each set of jaws includes first and second pairs of jaws mounted orthogonally to each other.

In a further aspect of the invention, the first set of jaws is mounted further away from the lathe than the second set of jaws, and the jaws of the first set of jaws are longer in a direction perpendicular to the orientation of the first set of jaws than the jaws of the second set of jaws.

In a further aspect of the invention, a workpiece positioning device is provided so that repeated cuts of pipes may be made without re-positioning the pipes. In this aspect of the invention, there may only be one set of jaws.

These and further aspects of the invention will now be described.

BRIEF DESCRIPTION OF THE DRAWINGS

There will now be described preferred embodiments of the invention, with reference to the drawings, by way of illustration, in which like numerals denote like elements and in which:

FIG. 8 is a perspective view of a chuck, jaws and workpiece positioning device according to the invention.

DETAILED DESCRIPTION OF PREFERRED EMBODIMENTS

Figure 1:
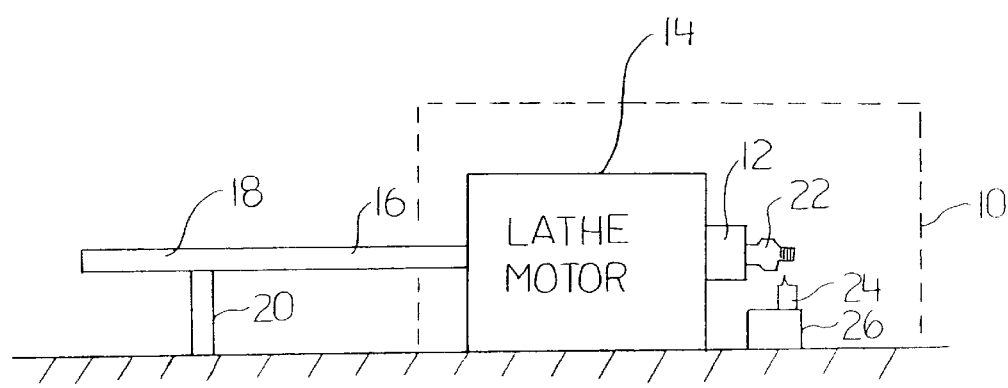
FIG. 1 is a schematic showing a drill pipe in position on a lathe for machining the box or pin at one end of the drill pipe.

Referring to FIG. 1, there is shown a lathe 10 with a chuck 12 mounted on one side of a lathe motor 14. The chuck 12 is driven rotationally under power by the lathe motor 14 in conventional fashion. A drill pipe 16 being worked has one connector end 18 resting in a steady rest or cradle 20, and the other connector end 22 is held by the chuck 12 in working position against a tool 24. As the drill pipe 16 rotates, the tool 24 may be moved by machine assembly 26 in accordance with a desired pattern that is input by an operator. The tool 24 and machine assembly 26 form a means to machine work pieces mounted on the lathe. Any of various conventional tools and associated machine assemblies may be used, such as boring, facing, turning, threading and bevelling tools made by such well known manufacturers as Kennametal Limited, Raleigh, S.C., U.S.A., Sandvik Coromant Co., Fairlawn, N.J., U.S.A., and Valenite Inc. of Madison Hts., Mich., U.S.A.

Figure 2:
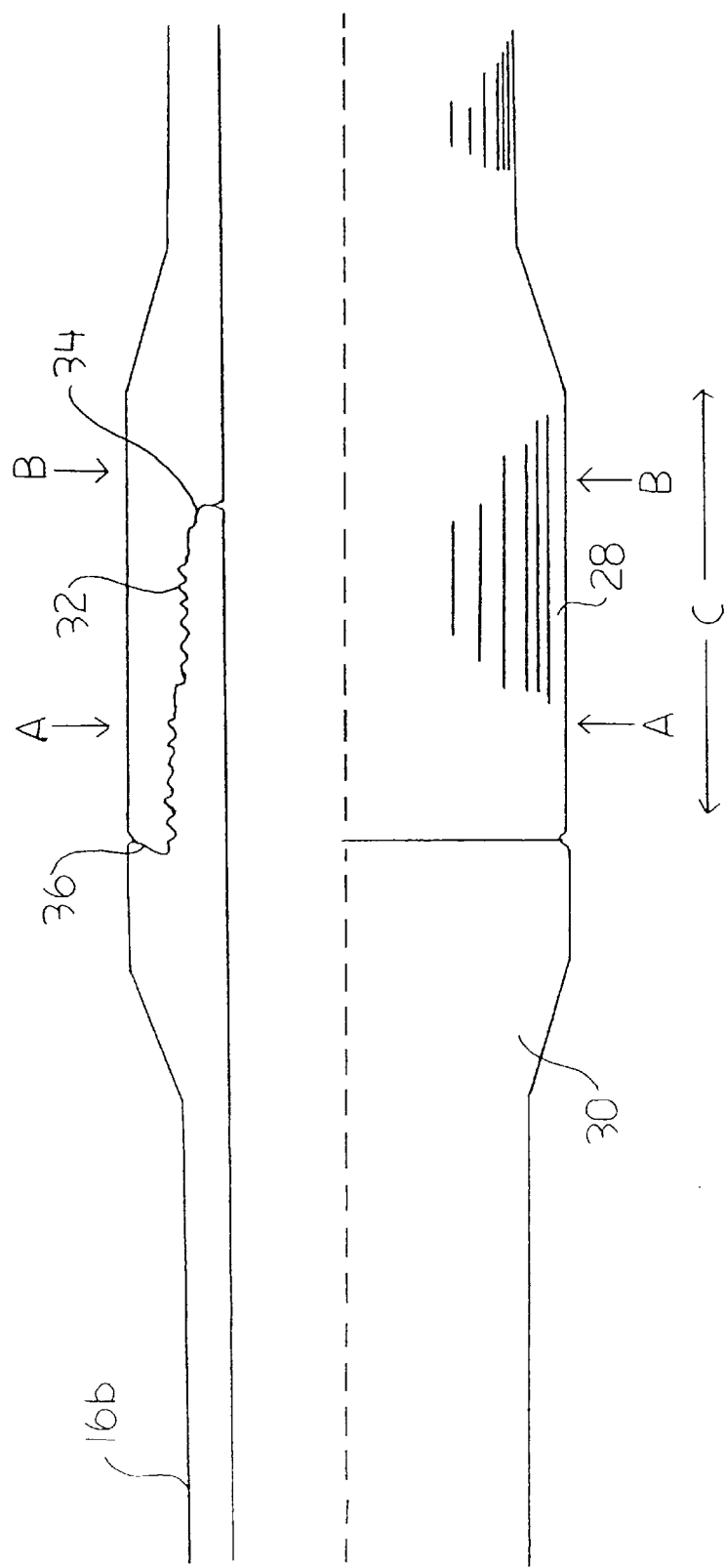
FIG. 2 is a side view, partly in section, of a typical drill pipe showing where the chuck of the invention grips the drill pipe.

Referring to FIG. 2, a joint between two drill pipes 16a and 16b is shown. The joint is formed between the box connection 28 of drill pipe 16a and pin connection 30 of drill pipe 16b. In this patent document, the box and pin connection both may be referred to as connector ends, which are enlarged in relation to the rest of the drill pipe. Each connector end includes mating threaded portions 32 and sealing portions 34 and 36.

Figure 3:
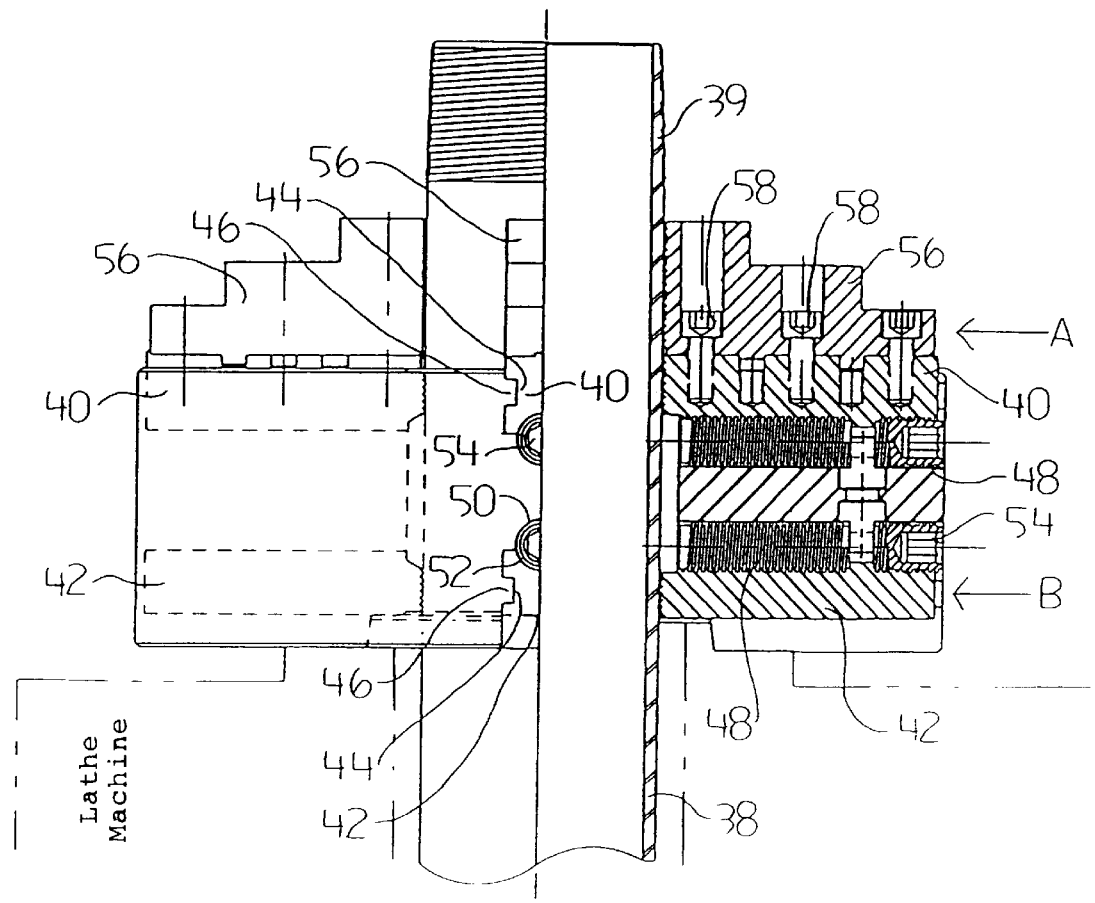
FIG. 3 is a top view, partly in section, showing a chuck for a lather according to the invention.
Figure 4:
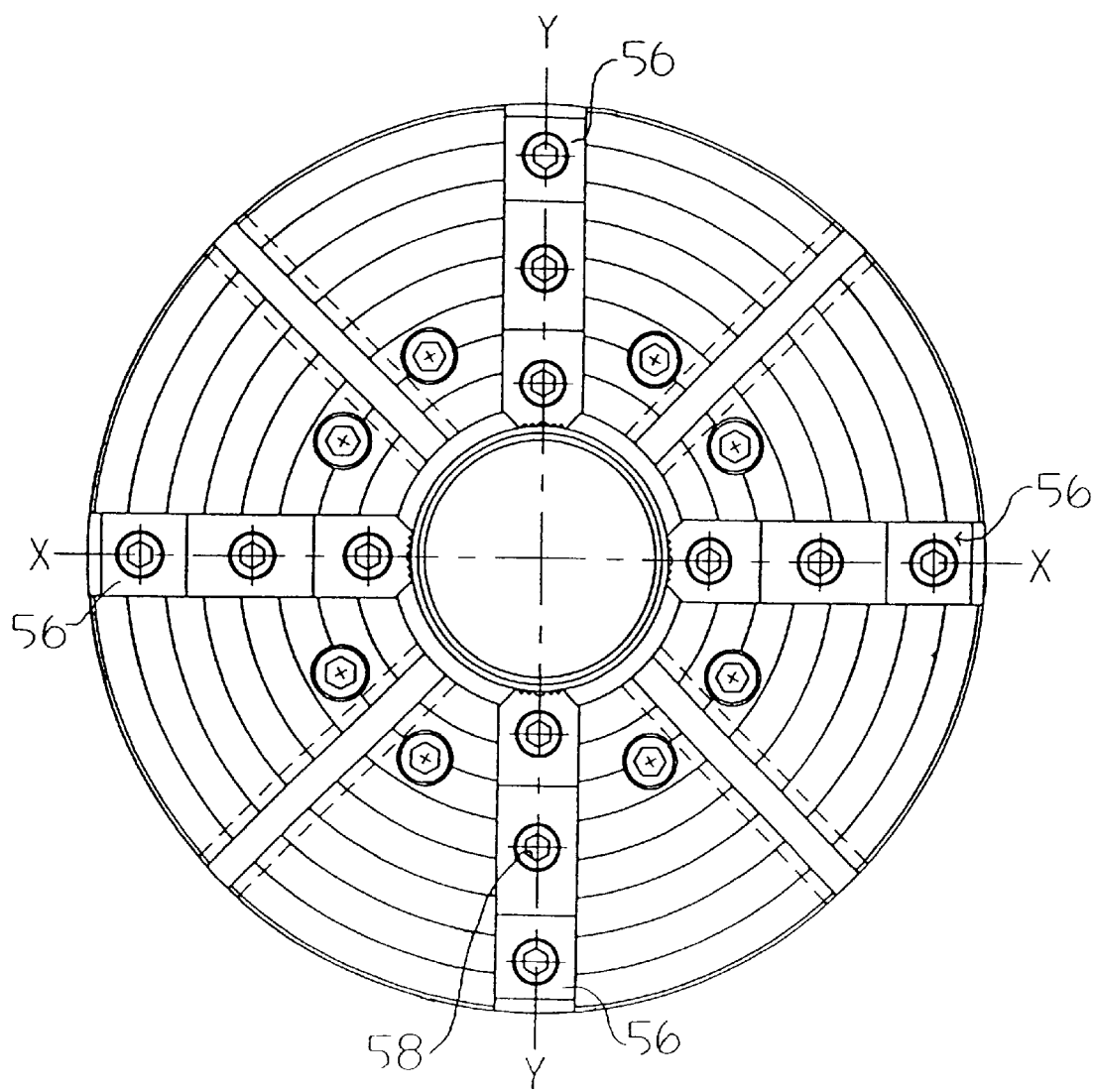
FIG. 4 is an end view of a chuck for a lathe according to the invention.

Referring to FIGS. 3 and 4, there is shown a chuck 12 with longitudinally spaced radially oriented first and second sets of jaws 40, 42 mounted on the chuck 12. The first set of jaws 40 is mounted in a first longitudinal position A and the second set of jaws 42 is mounted in a second longitudinal position B spaced from the first longitudinal position. Each position A and B is shown roughly bisecting the jaws. Each of the first and second sets of jaws 40, 42 include jaws mounted on x and y axes for positioning the jaws along the respective axes. In FIG. 4, both x and y axes are in the plane of the figure, while in FIG. 3, one of the axes is perpendicular to the plane of the figure. Each jaw 40, 42 has slots 44 formed in the side of the jaw 40, 42, and the jaws 40, 42 are mounted in the chuck 12 with ridges 46 received by the slots 44. The slots 44 and ridges 46 form tracks for the jaws to slide on and retain the jaws 44 within the chuck 12. The jaws 40, 42 may be adjusted in the chuck 12 by screws 48. The screws 48 are received by threaded semi-cylindrical slots 50 in the chuck 12. Corresponding threaded semi-cylindrical slots 52 in the jaws 42 complete threaded holes for receiving the screws 48. The tops of the screws 48 have hexagonal slots 54 for receiving hex wrenches. Rotation of the screws 48 causes the jaws 40, 42 to move radially in the chuck 12. The screws 48, together with the slots 44, 50 and 52 and ridges 46, form means to adjust the position of each of the jaws in the chuck. Each jaw of each set of jaws is independently adjustable.

A pipe 38, without upset, is shown gripped by the chuck 12 in FIG. 3, with its pin connection 39 extending forward from the chuck 12 in working position. In this instance, the chuck 12 may be located as close as is feasible to the pin connection 39. In the case of machining connector ends of drill pipe 16a or 16b, the front set of jaws 40 may be centered at the position marked A in FIG. 2, and the rear set of jaws 42 may be centered at the position marked B in FIG. 2. The exact location of the jaws will depend to some extent on the length of upset as indicated by the notation C in FIG. 2. If the upset is large enough, as with box connection 28, both sets of jaws 40, 42 may fit on the upset as shown in FIG. 2. With a short upset it may be possible only to fit one of the sets of jaws on the upset.

As shown in FIGS. 3 and 4, it is preferable that there be two mutually orthogonal pairs of jaws in each set of jaws, for a total of eight jaws. It is possible to use only six jaws, with three jaws mounted at 120° to each other in each set, but this makes it difficult for the operator to adjust the drill pipe. While such a design does allow manipulation of the connector end of the drill pipe in both the x and y directions, it is hard to adjust because rotation of any two jaws necessarily changes the position of the drill pipe in both x and y directions. With the design shown in FIGS. 3 and 4, two jaws can be operated independently for each of the x and y directions.

The jaws 40 of the front set of jaws are elongated by addition of jaw pieces 56 screwed by screws 58 onto the sides of the jaws. The jaw pieces 56 make the total jaw length, in a direction along the chuck (perpendicular to the plane defined of the first set of jaws), greater than the length of the jaws 42 of the second set of jaws. Both sets of jaws may be elongated in this manner if possible, but there is not enough room for the second set of jaws 42 to be extended in the chuck shown. In the case of jaws 42, the body of the chuck gets in the way on one side of the jaws and on the other side the lathe motor itself must be connected by a drive (conventional and not shown) to the chuck and this leaves no room for additional jaw length. The additional length of jaws permits the jaws to grip the pipe firmly.

In the method of operating the lathe with the chuck of FIGS. 3 and 4, the first step is to mount the drill pipe in a lathe with one end of the drill pipe 16 resting in steady rest 20. Next, one connector end 22 (either end 16a or 16b) of the drill pipe is gripped with each of the first and second sets of jaws 40, 42, by insertion of the drill pipe into the chuck and tightening the jaws 40, 42 onto the drill pipe. The operator may then rotate the drill pipe to determine if the connector end 22 is rotating in a circle. Conventional means may be used to determine the deviation of the rotation from a circle. If the connector end 22 is not rotating in a circle, within measurable tolerances, then the connector end may be oriented by manipulation of the first and second sets of jaws into a working position. The connector end may be moved in either or both of the x and y directions by screwing of the x and y jaws respectively. Once orientation of the jaws is complete, the drilling pipe may be rotated against the working tool. Both the threaded portion and sealing portions of the connector end may be machined to produce a new threaded portion and sealing portion of the connector end. The method of the invention is believed applicable to any cylindrical work piece with an end requiring work, but has particular utility for machining a box or pin connection of a drill pipe. While the connector end is being worked, the other end of the relatively flexible drill pipe rests on the steady rest 20. The drill pipe, once repaired, may be returned to the drilling contractor and used again for drilling. As the drill pipe is used and the connector ends become worn again, the drill pipe can continue to be repaired by repetition of the method of the invention until insufficient upset remains to permit further machining of the connector ends.

Figure 5:
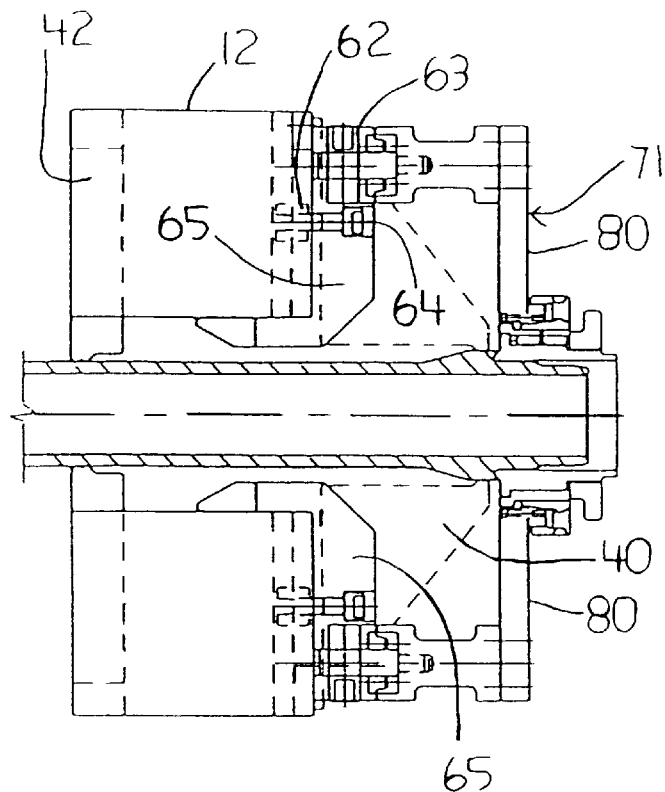
FIG. 5 is a side view of a chuck and jaws according to the invention showing a workpiece positioning device in working position on the chuck.
Figure 5A:
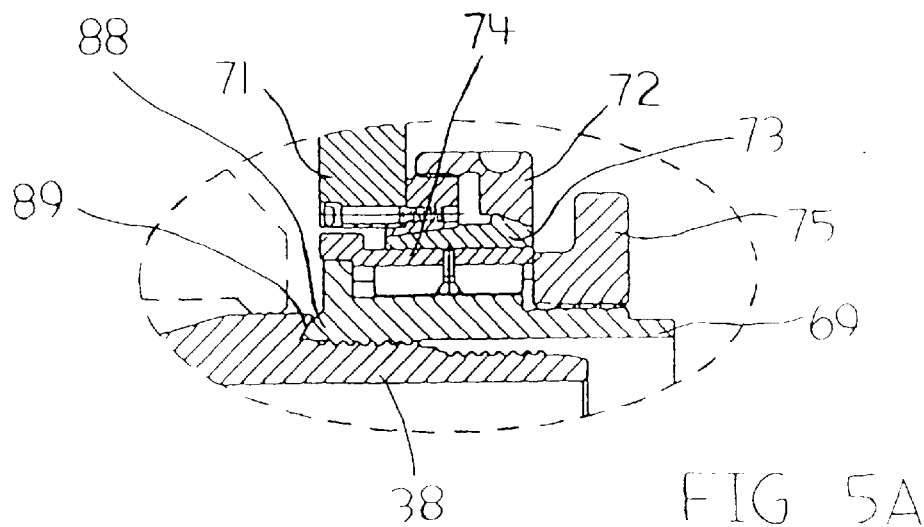
FIG. 5A is a blow up of a portion of FIG. 5.
Figure 6:
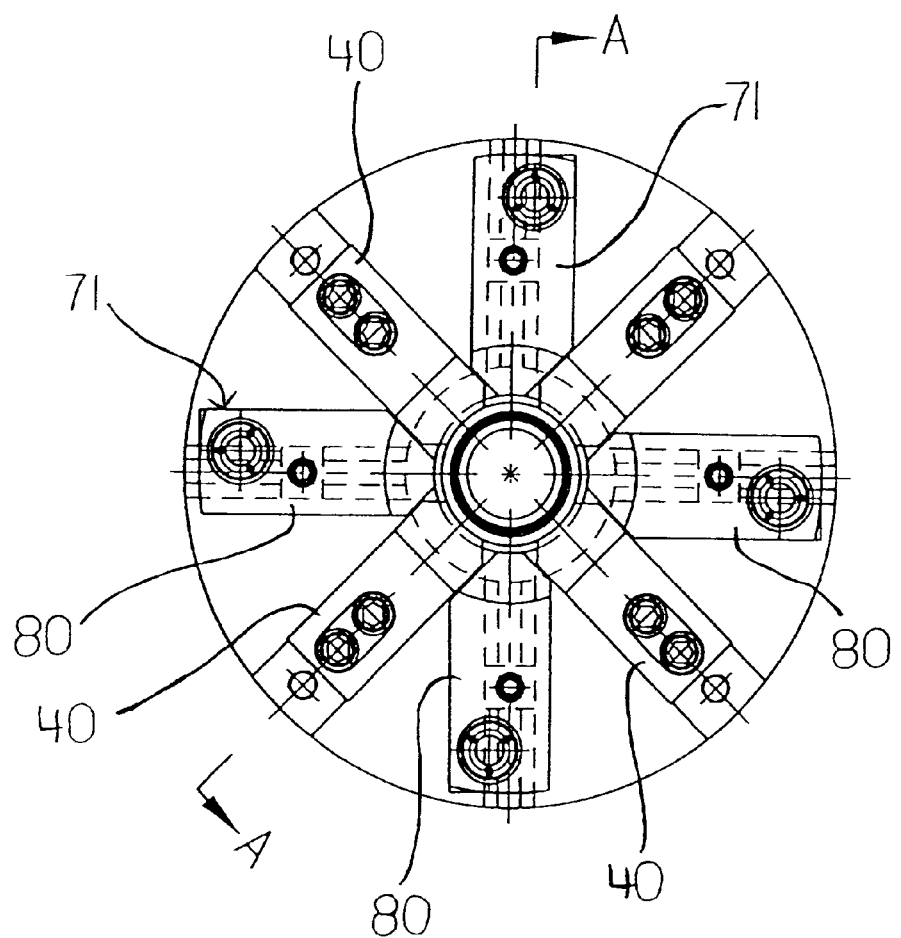
FIG. 6 is an end view of the chuck, jaws and workpiece positioning device.
Figures 7, 7A:
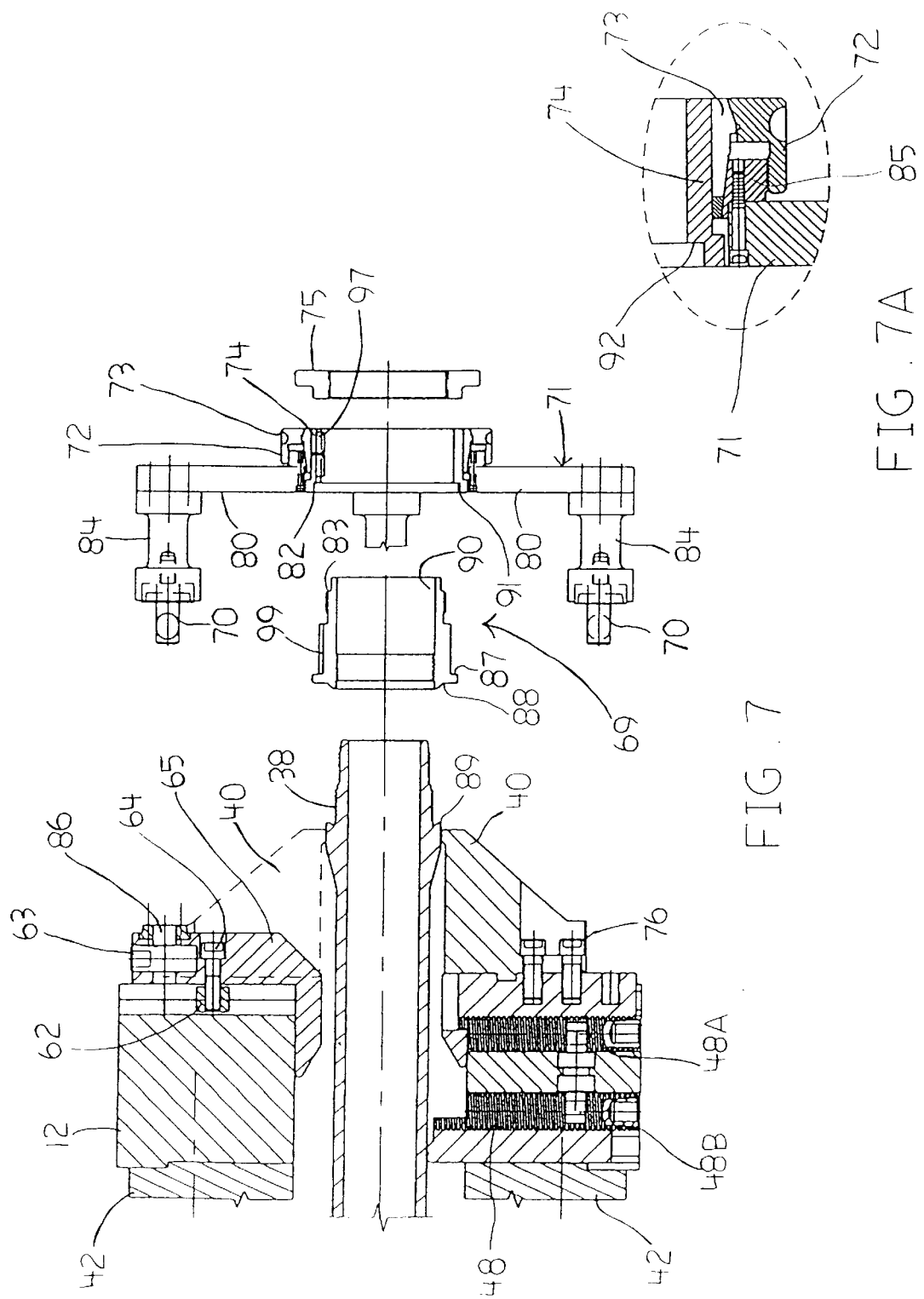
FIG. 7 is a section, partially exploded, through the device shown in FIGS. 5 and 6 along the line A—A shown in FIG. 6.
FIG. 7A is a blow up of a portion of FIG. 7.

A workpiece positioning device will now be described in relation to FIGS. 5–8. A chuck 12 with jaws 40 and 42 are used as described in relation to FIG. 3. The workpiece positioning device uses a frame or spider assembly 71 for repeated exact positioning of a tool joint pipe 38 within chuck 12. The pipe 38 has a shoulder 89. The spider assembly 71 has four arms 80 extending from a hub 82, which when the spider assembly 71 is fixed to the chuck is aligned with the opening in the chuck which receives the pipe to be worked on. Each arm 80 terminates outwardly at a pedestal 84 from which a cam pin 70 extends parallel to the axis of the hub 82. A spider mounting frame 65 formed of four arms disposed between the jaws 40 is secured to the chuck 12 using T-slot blocks 62 and capscrews 64. Each arm of the spider mounting frame 65 has a cam pin receiving hole 86 and cam 63 for receiving and securing the cam pins 70 of the spider assembly 71. At the hub 82 is a tool joint jig 69 with a shoulder 88, the bore 90 of the tool joint jig 69 being sized to snugly receive a connector end of a pipe 38. The spider assembly 71 is supplied with a locking nut 72 threaded onto a ring 85 screwed onto the hub 82 over a collet 73, a bushing 74 within hub 82 and a jam wing nut 75 that threads onto exterior threads 83 of the tool joint jig 69. See FIG. 7A in particular for these features. The tool joint jig 69, hub 82, locking nut 72, collet 73, bushing 74 and wing nut 75 permit a tool joint pipe to be secured within the spider assembly 71 in a fixable, and repeatable position. Bushing 74 inside diameter is about the same size as the central portion of the tool joint jig 69 for it fits snugly within the tool joint jig 69. A keyway 99 on the tool joint jig receives a key 97 in the bushing 74 (See FIG. 5A).

Operation of the spider assembly for cutting workpieces is according to the following face and chase procedure.

1 Install spider mounting frame 65 into machine chuck 12 with t-slot blocks 62 and capscrews 64.

2 Install top jaws 40 with top jaws capscrews 76.

3 Install tool joint pipe 38 into chuck 12 a predetermined distance conventionally determined according to the work order, secure with top jaws 40 by turning operating screw 48A and align pipe I.D. with alignment jaws 42, by turning operating screws 48B.

4 Cut tool joint as per work order.

Figure 9:
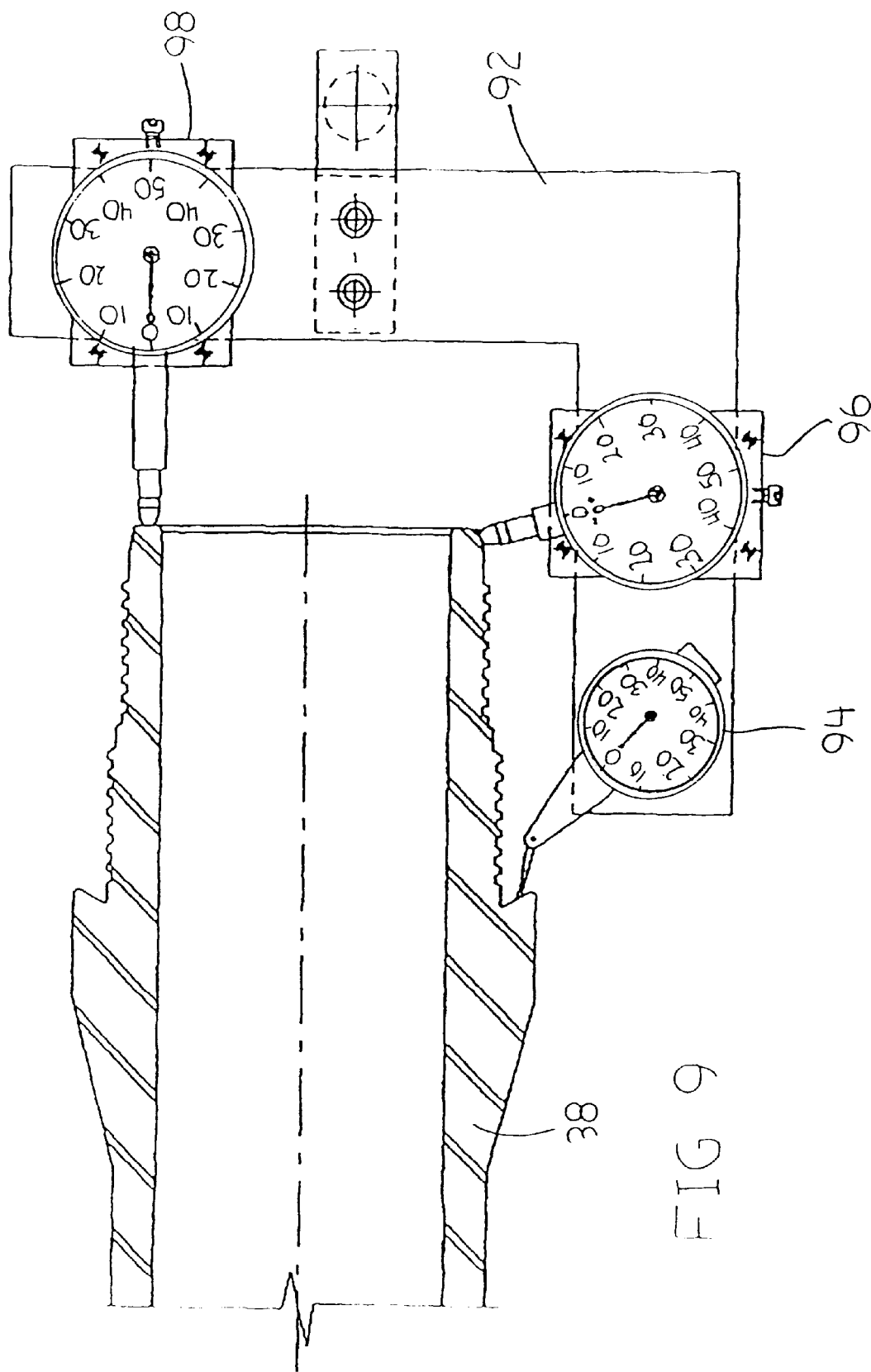
FIG. 9 shows an alignment system for initial alignment of a workpiece before cutting.

5 Move tool post 92 with alignment dials 94, 96 and 98 until they engage shoulders of the pipe 38 as illustrated in FIG. 9, and set dials to "0" reading.

6 Back off tool post 92 and remove alignment dials 94, 96 and 98.

7 Install tool joint jig 69 onto tool joint pipe 38 until shoulder 88 makes-up tight to shoulder 89.

8 Install spider assembly 71 into spider mounting frame 65 and lock in cam pins 70 in position with cams 63. with the tool joint jig 69 in the hub 82.

9 Install jam wing nut 75 onto tool joint jig 69 to align bushing 74 such that shoulders 87 and 91 abut and tighten up.

10 Tighten up locking nut 72 to lock in position collet 73.

11 Unlock and remove jam wing nut 75.

12 Unlock cams 63 and remove spider assembly 71.

13 Unscrew and remove tool joint jig 69.

14 Loosen-up operating screws 48B to back-up alignment jaws 42 to clear tool joint o.d.

15 Loosen-up operating screws 48A to back-up top jaws 40 and remove tool joint pipe 38.

16 Install damaged tool joint pipe through chuck 12 to predetermined distance (do not tighten jaws 40).

17 Install tool joint jig 69 onto damaged tool joint pipe until shoulder 88 makes-up tight to shoulder of damaged tool joint pipe.

18 Install spider assembly 71 onto tool joint jig 69.

19 Install jam wing nut 75 and tighten-up to spider assembly 71.

20 Line-up one cam pin 70, which may be marked for this purpose, in relation to a correspondingly marked socket 86 on spider mounting frame 65 and install spider assembly 71 with tool joint pipe 38 as one unit and lock-in cams 63.

21 Tighten-up top jaws 40 by turning operating screws 48A onto tool joint pipe 38 and align tool joint pipe 38 with alignment jaws 42 by turning operating screws 48B.

22 Unlock and remove jam wing nut 75.

23 Unlock cams 63 and remove spider assembly 71.

24 Unscrew and remove tool joint jig 69.

25 Check alignment of pin seal faces by seal alignment jig 92 with alignment dials 94, 96 and 98. Move seal alignment jig 92 until dials read "0" (do not re-adjust dials).

26 Recut tool joint 38 (face & chase operation or as step 4).

27 Repeat steps 14 to 26 for another damaged tool joint pipe.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A lathe for machining a drill pipe, the lathe comprising:
    a lathe motor defining a longitudinal axis and having a first side and second side, the second side spaced longitudinally from the first side along the longitudinal axis;
    a chuck mounted on the first side of the lathe motor;
    first and second sets of jaws adjustably mounted on the chuck, the first set of jaws being mounted radially in the chuck at a first longitudinal position and the second set of jaws being mounted radially in the chuck at a second longitudinal position spaced from the first longitudinal position, each of the first and second sets of jaws including x and y positioning jaws;
    a steady rest located on the second side of the lathe motor to receive an end of a cylindrical workpiece; and
    the motor operably connected to the chuck for rotating the chuck.

2. The lathe of claim 1 in which each set of jaws includes first and second pairs of jaws mounted orthogonally to each other.

3. The lathe of claim 1 in which the first set of jaws is mounted further away from the motor than the second set of jaws, and the jaws of the first set of jaws are longer in a direction perpendicular to the first set of jaws than the jaws of the second set of jaws.

* * * * *

UNITED STATES PATENT AND TRADEMARK OFFICE
CERTIFICATE OF CORRECTION

PATENT NO. : 6,199,462 B1  
DATED : March 13, 2001  
INVENTOR(S) : T.A.M. Hallett Page 1 of 1

It is certified that error appears in the above-identified patent and that said Letters Patent is hereby corrected as shown below:

<u>Title page,</u>  
Item [56], References Cited, insert in appropriate order the following:  
-- OTHER PUBLICATIONS  
F. Pratt & Co. Ltd. product brochure entitled "PRATT CHUCKS", 32 pp., Jul. 1961.  
Autoblok Automatic Indexing Chucks product brochure, 12 pp., published before filing of instant application [7/28/98]. --

Signed and Sealed this

Twenty-fifth Day of December, 2001

*Attest:*

*Attesting Officer*

JAMES E. ROGAN  
*Director of the United States Patent and Trademark Office*